(12) United States Patent
Hughes et al.

(10) Patent No.: US 11,798,087 B1
(45) Date of Patent: Oct. 24, 2023

(54) TRIAGE TOOL FOR INVESTMENT ADVISING

(71) Applicant: Wells Fargo Bank, N.A., San Francisco, CA (US)

(72) Inventors: Riley Warren Hughes, St. Charles, MO (US); Waila Jameelah Skinner, St. Louis, MO (US); Craig N. Strubing, St. Louis, MO (US); Ashwin George Jose, St. Louis, MO (US); Timothy J. Hykes, Florissant, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 104 days.

(21) Appl. No.: 17/198,395

(22) Filed: Mar. 11, 2021

Related U.S. Application Data (63) Continuation of application No. 16/037,740, filed on Jul. 17, 2018, now Pat. No. 10,963,965.

(51) Int. Cl.
  *G06Q 40/06* (2012.01)
  *G06F 16/435* (2019.01)
  *G06F 3/04883* (2022.01)

(52) U.S. Cl.
  CPC ......... *G06Q 40/06* (2013.01); *G06F 3/04883* (2013.01); *G06F 16/437* (2019.01)

(58) Field of Classification Search
  CPC .................................................. G06Q 40/06
  See application file for complete search history.

(56) References Cited

U.S. PATENT DOCUMENTS

| 4,901,575 | A | * | 2/1990 | Bohannan | G01M 5/0008 73/594 |
|---|---|---|---|---|---|
| 6,408,309 | B1 | | 6/2002 | Agarwal | |
| 6,795,808 | B1 | | 9/2004 | Strubbe et al. | |
| 7,725,377 | B2 | | 5/2010 | Jain | |
| 7,801,787 | B2 | | 9/2010 | Jain et al. | |
| 8,775,300 | B2 | | 7/2014 | Showalter | |
| 9,244,911 | B2 | | 1/2016 | Allen et al. | |
| 9,760,873 | B1 | * | 9/2017 | Cook | G06Q 20/3821 |

(Continued)

OTHER PUBLICATIONS

"U.S. Appl. No. 16/037,740, Advisory Action dated Jun. 2, 2020", 3 pgs.

(Continued)

*Primary Examiner* — Scott C Anderson
(74) *Attorney, Agent, or Firm* — SCHWEGMAN LUNDBERG & WOESSNER, P.A.

(57) ABSTRACT

Various examples are directed to computer-implemented systems and methods for providing a triage tool for investment advising. A method includes displaying, by a processor of a computer, an image on a graphical user interface (GUI) of a device of a user. The image includes information related to financial account management for the user. Input options are provided to the user on the GUI including at least two directional swipe input options to obtain the user's positive or negative response to the image. The processor receives the user's response to the input options, and determines a profile of the user based on the user's response to the input options. The processor provides directed financial investment advice and tailored financial products, based on the profile of the user, to increase applicability and effectiveness of wealth management for the user.

20 Claims, 6 Drawing Sheets

(56) References Cited

U.S. PATENT DOCUMENTS

| | | | |
|---|---|---|---|
| 10,368,133 | B1 | 7/2019 | Denk, Jr. et al. |
| 10,963,965 | B1 | 3/2021 | Hughes et al. |
| 2003/0046557 | A1* | 3/2003 | Miller .................. H04L 63/0861 |
| | | | 713/186 |
| 2003/0055762 | A1* | 3/2003 | Holt ....................... G06Q 30/02 |
| | | | 707/999.01 |
| 2005/0027632 | A1 | 2/2005 | Zeitoun et al. |
| 2006/0242652 | A1 | 10/2006 | Stearn |
| 2009/0276368 | A1 | 11/2009 | Martin et al. |
| 2012/0203568 | A1 | 8/2012 | Francis et al. |
| 2014/0201647 | A1 | 7/2014 | Scherpa et al. |
| 2014/0365399 | A1* | 12/2014 | Dennelly ............... G06Q 40/06 |
| | | | 705/36 R |
| 2014/0372896 | A1* | 12/2014 | Raman .................... G06F 3/017 |
| | | | 715/741 |
| 2015/0206128 | A1 | 7/2015 | Torossian et al. |
| 2015/0346937 | A1 | 12/2015 | Mahmoudian-bidgoly et al. |
| 2015/0356548 | A1 | 12/2015 | Luna-rodriguez et al. |
| 2016/0239918 | A1 | 8/2016 | Lambur et al. |
| 2017/0213288 | A1 | 7/2017 | Zhang et al. |
| 2017/0236215 | A1 | 8/2017 | Eisen et al. |
| 2017/0344246 | A1 | 11/2017 | Burfitt |
| 2018/0075492 | A1* | 3/2018 | Squire .................. G06F 3/04842 |
| 2018/0108058 | A1* | 4/2018 | Cotton ............... G06Q 30/0278 |
| 2018/0130156 | A1* | 5/2018 | Grau .................. G06Q 50/2057 |
| 2018/0218456 | A1* | 8/2018 | Kolb ...................... G06Q 30/08 |

OTHER PUBLICATIONS

"U.S. Appl. No. 16/037,740, Examiner Interview Summary dated Oct. 15, 2020", 2 pgs.

"U.S. Appl. No. 16/037,740, Final Office Action dated Mar. 23, 2020", 29 pgs.

"U.S. Appl. No. 16/037,740, Non Final Office Action dated Jul. 29, 2020", 30 pgs.

"U.S. Appl. No. 16/037,740, Non Final Office Action dated Oct. 30, 2019", 29 pgs.

"U.S. Appl. No. 16/037,740, Notice of Allowance dated Dec. 2, 2020".

"U.S. Appl. No. 16/037,740, PTO Response to Rule 312 Communication dated Mar. 5, 2021".

"U.S. Appl. No. 16/037,740, Response filed Jan. 30, 2020 to Non Final Office Action dated Oct. 30, 2019", 12 pgs.

"U.S. Appl. No. 16/037,740, Response filed May 20, 2020 to Final Office Action dated Mar. 23, 2020", 13 pgs.

"U.S. Appl. No. 16/037,740, Response filed Oct. 29, 2020 to Non Final Office Action dated Jul. 29, 2020".

"OCBC Bank launches integrated wealth management app", https://www.enterpriseinnovation.net/article/ocbc-bank-launches-integrated-wealth-management-app-1227789893, (Mar. 16, 2016), 4 pgs.

U.S. Appl. No. 16/037,740 U.S. Pat. No. 10,963,965, filed Jul. 17, 2018, Triage Tool for Investment Advising.

* cited by examiner

TRIAGE TOOL FOR INVESTMENT ADVISING

CLAIM OF PRIORITY

This application is a Continuation of U.S. patent application Ser. No. 16/037,740, filed Jul. 17, 2018, the benefit of priority of which is claimed hereby, and which is incorporated by reference herein in its entirety.

TECHNICAL FIELD

Embodiments described herein generally relate to automated financial investment management and, for example and without limitation, to systems and methods for triage tools for investment advising.

BACKGROUND

A financial institution would benefit from current individual feedback from account holders to determine appropriate products and personalized investment profiles to match the account holder's financial objectives and level of sophistication. The account holders would also benefit from a user-friendly intuitive interface to obtain targeted financial investment assistance and to be able to manage account transactions automatically from the interface.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

The present subject matter provides a system and method for providing a triage tool for investment advising. The triage tool can be used to quickly assess a user's interests, investment experience, investment comfort level, and desired investment advice. The tool displays images such as questions or graphics on a user's device, and receives an input from the user in the form of a swipe. The user's input indicates whether the user is interested or disinterested, or has a positive or negative association with the image. Based on the received input from the user, investment advice or recommendations can be made, including using trained data from a machine learning algorithm in various embodiments.

Figure 1A:
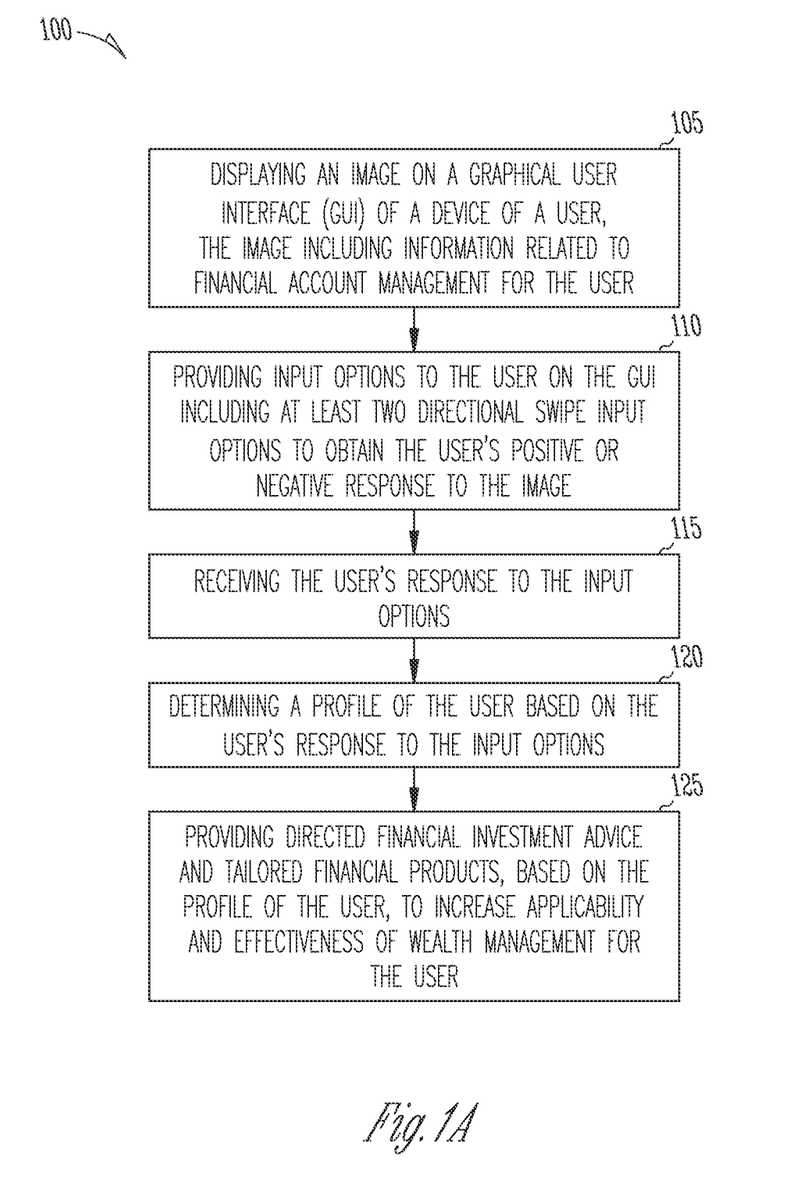
FIG. 1A illustrates an example embodiment of a computer-implemented method for providing a triage tool for investment advising.

FIG. 1A illustrates an example embodiment of a computer-implemented method 100 for providing a triage tool for investment advising. The method 100 includes displaying, by a processor of a computer, an image on a graphical user interface (GUI) of a device of a user, at operation 105. The image includes information related to financial account management for the user. At operation 110, input options are provided to the user on the GUI including at least two directional swipe input options to obtain the user's positive or negative response to the image. The processor receives the user's response to the input options at operation 115, and determines a profile of the user based on the user's response to the input options at operation 120. At operation 125, the processor provides directed financial investment advice and tailored financial products, based on the profile of the user, to increase applicability and effectiveness of wealth management for the user.

According to various embodiments, the profile of the user is determined based on the user's response to the input options, including using a machine learning system to determine the profile of the user. In various embodiments, the directional swipe input options include a first horizontal swipe option to indicate a positive association by the user of the image, and a second horizontal swipe option to indicate a negative association by the user of the image, where the second horizontal swipe option is in an opposite direction to the first horizontal swipe option. The directional swipe input options include a vertical swipe option to indicate the user has a question about the image, in an embodiment. In various embodiments, receiving the vertical swipe option can direct the user to a frequently asked questions (FAQ) interface, or to an interactive session with a representative of a financial institution. The directional swipe input options include a vertical swipe option to indicate the user has a strong positive or negative association with the image, in an embodiment. In various embodiments, a plurality of images are displayed periodically to obtain additional information from the user for use in determining the profile of the user, and the additional information is aggregated and stored for use in determining the profile of the user. The method further includes providing a notification to the device of the user prompting the user to display the image on the GUI and to provide a response to the input options, in various embodiments. In one embodiment, the notification is customized for the user.

Figure 1B:
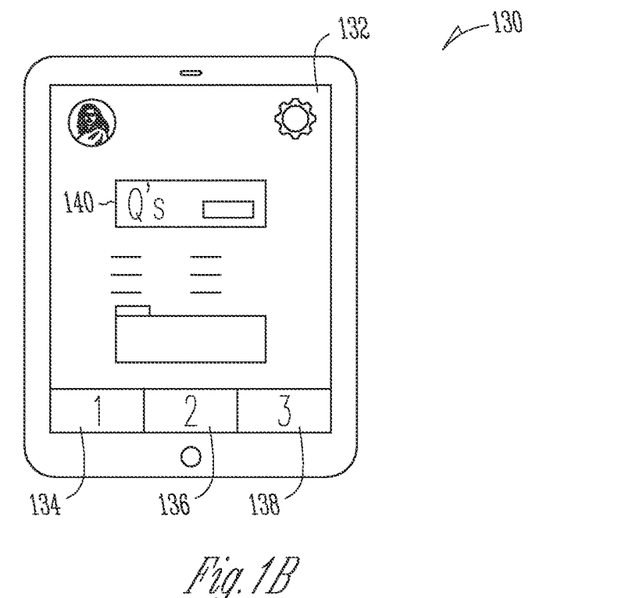
FIG. 1B-1C illustrate example embodiments of a user interface for a triage tool for investment advising.
Figure 1C:
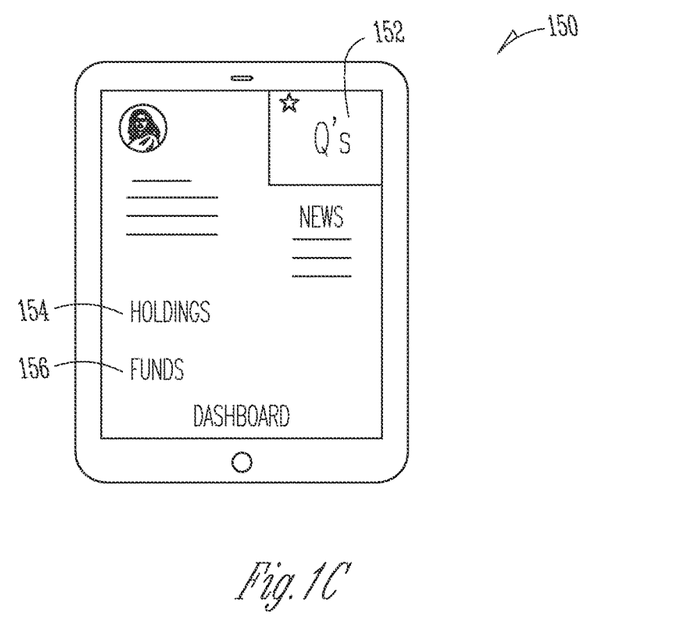

FIG. 1B-1C illustrate example embodiments of a user interface for a triage tool for investment advising. In FIG. 1B, a display 132 on a user device 130 includes options for user input, including a first input 134 for a user to request new questions or images 140 that require a user response, such as a swipe left or right, in various embodiments. A second user input 136 provides the user with a link to a dashboard or home screen, in an embodiment. A third user input 138 provides the user with a link to investment activities, such as trades, investment history, or current user holdings, in various embodiments. In FIG. 1C, a display 152 on a user device 150 includes options for user questions, as well as a display of current user holdings 154 and current user funds 156, in various embodiments.

In various embodiments, the triage tool is an application (or app) on a user device, such as a smart phone, computer or tablet. The app provides a mechanism for the user to input likes and dislikes regarding investments using swipes as inputs, and then determines how the user should invest based on the inputs, in various embodiments. According to various embodiments, the user inputs are used to: perform risk profiling of the user; determine if the user is best served with self-directed products; recommend a type of portfolio for the user, provide contextual inquiries; and/or set up advanced user (customer) profiles using psychographics and personal details of the user. The app can determine which type of investment a user is best suited for, such as self-directed or financial advisor-directed trading, in an embodiment.

In various embodiments, the app provides additional questions or images requiring a swipe input from the user on a periodic basis, such as daily or weekly, to update recommendations for the user. The app receives input swipes from the user and determines a user's preferences, risk tolerance, and intent to invest, in various embodiments. Machine learning is used to correlate a user's response with risk and financial acumen, in various embodiments. The app further provides a connection with a user's accounts, such that the user can make trades or investment decisions based on recommendations provided by the app, without having to login to a separate interface in various embodiments. Thus, the present subject matter engages a user with interesting prompts to receive inputs and capture a user's investment interest while making it an enjoyable experience for the user.

The app can provide a mechanism to learn about life goals of a user or customer, such as college education or retirement. Based on the user's inputs, the app can determine how much the user can tolerate risk, and determine if the user has a rainy day fund, based on images or questions relating directly to particular user. The app uses simple conversational language with seemingly innocuous questions that give insight into a user's investment profile, in various embodiments. The image provided can include both text and graphics, or just text or just graphics, to apply to multiple types of learners. For example, in one embodiment the image includes a full piggy bank compared to an empty piggy bank, a small piggy bank, or a cracked piggy bank.

In addition to left and right swipe inputs to indicate positive or negative associations, the display may accept vertical swipes in various embodiments. In one embodiment, a user may swipe up to ask a question, and receive a follow up from a representative or a direction to a frequently asked question (FAQ) page. In another embodiment, a user may swipe up or down to indicate an especially strong like or dislike. The app provides a walk through when a user initializes their account, including a shadow box of certain items showing the user how to interact with the display. In one embodiment, a desktop version of the app provides for inputs using a mouse and keyboard. In various embodiments, a user can stop using the app at any time and the user's progress with be saved so that the user can resume from where they left off during the previous session. Various embodiments employ push notifications to a user to prompt the user for further inputs. Thus, the app can provide the user with continued learning and growth, and can change as the user's level of interest and sophistication changes over time.

In various embodiments, the app provides an on-demand connection for a user with a financial representative, such as a chat bot or chat box. The app provides a connection with investment accounts, such that the user only has a single login to link to all user accounts and provides data from the accounts in background, such that user inputs can update accounts. In various embodiments, the app makes recommendations to increase retirement contributions or savings based on user inputs. The app provides personalized push notifications to notify the user of changes to accounts and market events, in various embodiments. Machine learning algorithms, such as artificial intelligence (AI) algorithms, are used to make recommendations based on life events and question answers, in various embodiments. In various embodiments, the app can recommend consulting with specific financial representatives (retirement, mortgage, line of credit, etc.) based on the user's responses. Information received from the user can be aggregated and used for future product offerings, in an embodiment. In various embodiments, the app can show the user depictions of dream goals, such a vacation homes, automobiles, or college funds, to determine what the user values as long term goals. In one embodiment, the app determines a profile of a user, and can use the received inputs to generalize services—e.g., a majority of users in this age range want to use an app instead of a website.

The app displays psychographics, in various embodiments, and collects responses from the user to determine how a user would respond to certain events, such as market crashes. In one example, interview-like questions are provided to the user, such as how the user would perform in a type of situation. The app includes a "refer a friend" feature, in one embodiment. The app may include a premium level of service, which includes additional benefits such as providing additional time with an investment advisor, in an embodiment. The app can be used to provide instructions to the user for additional steps to take before meeting with a financial advisor, in an embodiment. In various embodiments, the app can initiate a session with a user to prompt the user with images for user input swipes when a user checks their bank account or credit card account. In addition, the app provides for user-initiation of a session, or provides the user with a mechanism to ask questions based on the results of a session. The app may also provide a research goal for follow up by the user, in an embodiment. Various embodiments of the app provide a point system to provide the user with a mechanism to 'buy' things in the app or out of the app. For example, the user may redeem points for a 30-minute consultation with financial advisor. The user can also purchase points from the interface, in an embodiment. Certain events can be structured, such as a "double points" day, and a user can receive a push notification of the events, in various embodiments.

Various embodiments of the present subject matter include a system for providing a triage tool for investment advising. The system includes a computing device comprising at least one processor and a data storage device in communication with the at least one processor. The data storage device includes instructions thereon that, when executed by the at least one processor, causes the at least one processor to display an image on a graphical user interface (GUI) of the computing device, the image including information related to financial account management for a user. Input options are provided to the user on the GUI, including at least two directional swipe input options to obtain the user's positive or negative response to the image. The user's response to the input options is received, and a profile of the user is determined based on the user's response to the input options. Directed financial investment advice and tailored financial products are provided, based on the profile of the user, to increase applicability and effectiveness of wealth management for the user.

In various embodiments, the image includes one or more of investment questions, personal questions, risk-assessment questions, graphs, or contextual inquiries, related to possible investment goals of the user. The user profile includes one or more of investment goals of the user, investment preferences of the user, investment experience of the user, desired investment advice of the user, risk tolerance of the user, suitability of financial products for the user, psychographic profile of the user, biographical information of the user, or life events of the user, in various embodiments. The tailored financial products include one or more of financial advisor-directed or self-directed portfolio management tools, according to various embodiments. In various embodiments, the computing device can include a laptop, desktop, tablet or cellular telephone. Other computing devices can be used without departing from the scope of the present subject matter.

In various embodiments, a non-transitory computer-readable storage medium is provided. The computer-readable storage medium includes instructions that when executed by computers, cause the computers to perform operations of displaying an image on a graphical user interface (GUI) of a device of a user, the image including information related to financial account management for the user, providing input options to the user on the GUI including at least two directional swipe input options to obtain the user's positive or negative response to the image, receiving the user's response to the input options, determining a profile of the user based on the user's response to the input options, and providing directed financial investment advice and tailored financial products, based on the profile of the user, to increase applicability and effectiveness of wealth management for the user.

According to various embodiments, providing directed financial advice includes automatically providing a connection for the user with a representative of a financial institution. Providing directed financial investment advice includes providing one or more of recommendations regarding individual transactions, or recommendations regarding investment advisor contacts for the user, in various embodiments. In one embodiment, an additional operation includes providing a connection to user's investment account, and the input options include an option for the user to initiate financial account transactions from the GUI.

Figure 2:
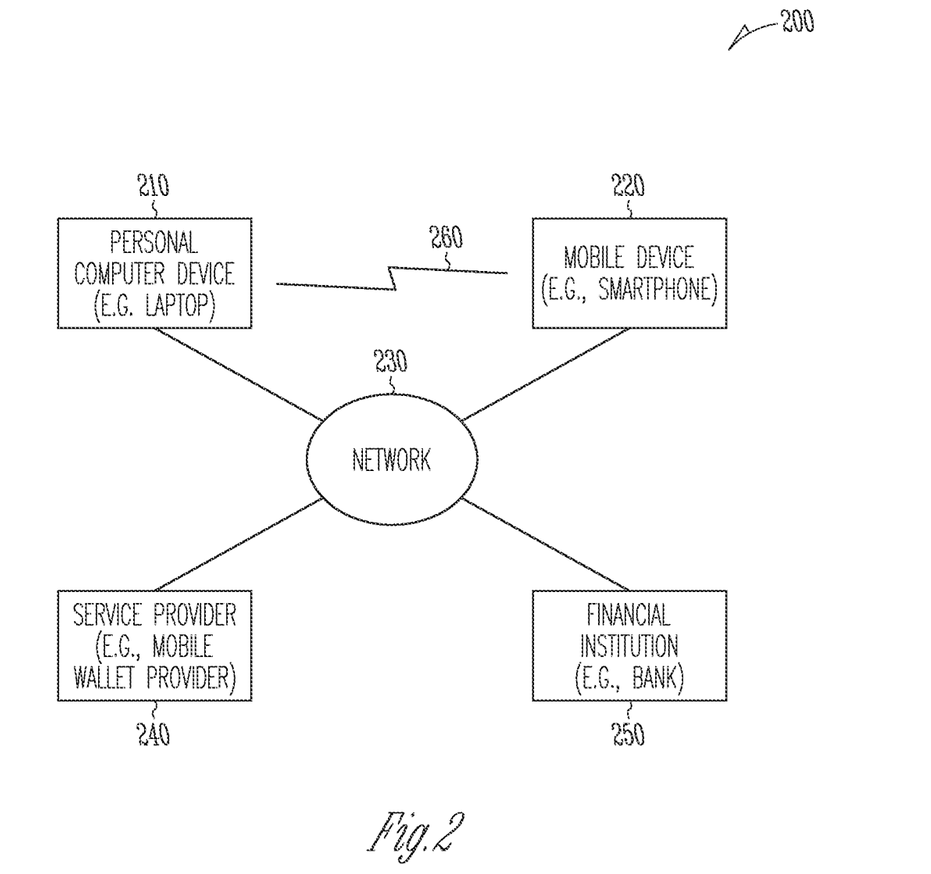
FIG. 2 illustrates an exemplary infrastructure for providing a triage tool for investment advising.

FIG. 2 illustrates an exemplary infrastructure for providing a triage tool for investment advising. The infrastructure comprises a personal computing device (e.g., laptop) 210, a mobile device (e.g., smartphone or wearable device) 220, a service provider 240, and a financial institution 250, a network 230, and a device network 260. The mobile device 220 is a mobile computing device such as smartphone, tablet computer, or other portable computing device. Exemplary mobile devices are Apple iPhone and Samsung Galaxy smartphone. Exemplary service providers are Apple, PayPal, and Samsung. The financial institution 250 is an organization that provides an account for the primary account holder, in various embodiments. Exemplary financial institutions are bank, credit/debit card companies, and the like.

The network 230 represents a virtual network that provides communication between entities 210, 220, 240 and 250. The network 230 can comprise Internet, LAN, Wi-Fi, home network, cellular network, NFC, and other types of networks, in various embodiments. The device network 260 is a wireless communication network between the mobile device 220 and personal computing device only. Exemplary wireless networks 260 are a Local area network (LAN), Personal Area Network (PAN), and body area network (BAN). The wireless network 260 can use Bluetooth, Near Field Communication (NFC), Wi-Fi, ZigBee, or other wireless technology, in various embodiments.

Figure 3:
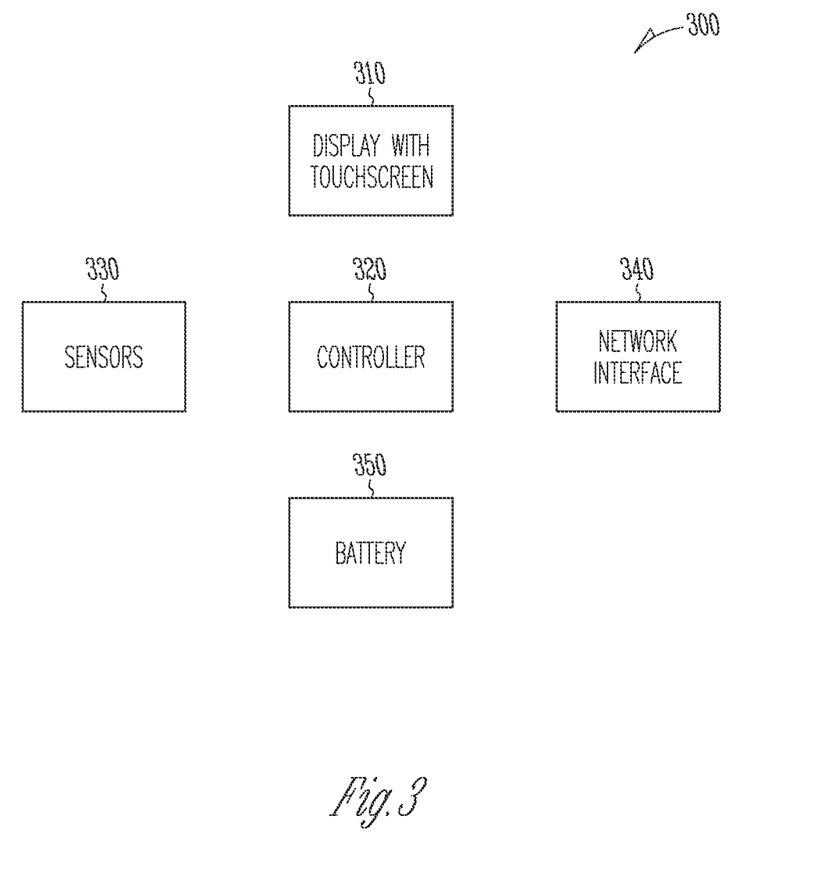
FIG. 3 illustrates an example embodiment of a computing device used by a user to display a triage tool for investment advising.

FIG. 3 illustrates an embodiment of computing device 300 used by a user to display a triage tool for investment advising. In the depicted embodiment, the computing device 300 includes a display with a touchscreen 310 interfaced with a controller or processor 320. The controller or processor 320 is electrically connected to one or more sensors 330, a network interface 340, and a battery 350 to supply power to the computing device 300, in various embodiments.

Figure 4:
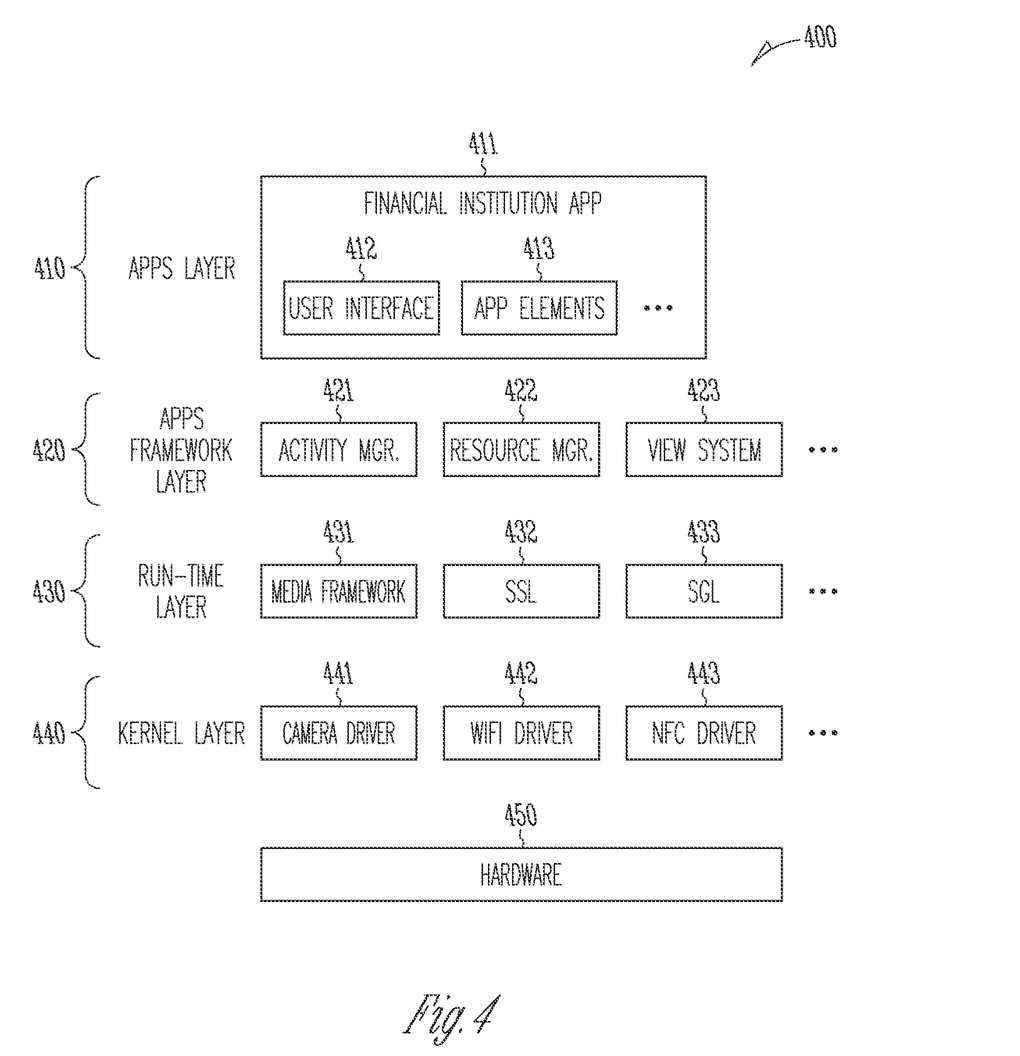
FIG. 4 illustrates an example embodiment of a computing device used for account transactions and for a triage tool for investment advising.

FIG. 4 illustrates an embodiment of a computing device 400 with a financial institution application 411. In various embodiments, the computing device 400 includes a mobile computing device such as a cellular telephone or smart phone. The depicted embodiment illustrates one example of software architecture executed on hardware 450, including one or more processors of the computing device 400. FIG. 4 is merely a non-limiting example of a software architecture and many other architectures can be implemented to facilitate the functionality described herein.

The representative hardware 450 comprises one or more processing units having associated executable instructions. Executable instructions represent the executable instructions of the software architecture, including implementation of the methods, modules, and components of the present subject matter. Hardware 450 also includes memory and/or storage modules, which also have executable instructions.

In the example architecture of FIG. 4, the software can be conceptualized as a stack of layers where each layer provides particular functionality. For example, the software can include layers such as an operating system, libraries, frameworks/middleware, applications and presentation layer. Other software architectures can include additional or different layers. The operating system can manage hardware resources and provide common services. The overall system can include, for example, a kernel layer 440, run-time layer 430, application framework layer 420 and application layer 410. The kernel layer 440 can act as an abstraction layer between the hardware and the other software layers. For example, the kernel layer 440 can be responsible for memory management, processor management (e.g., scheduling), component management, networking, security settings, and so on. The drivers can be responsible for controlling or interfacing with the underlying hardware. For instance, the drivers can include display drivers, camera drivers 441, Bluetooth® drivers, flash memory drivers, serial communication drivers (e.g., Universal Serial Bus (USB) drivers), Wi-Fi® drivers 442, near field communication (NFC) drivers 443, audio drivers, power management drivers, and so forth depending on the hardware configuration.

The run-time layer 430 can include a media framework 431, a secure sockets layer (SSL) 432 and a secure group layer (SGL) 433, in various embodiments. The application framework layer 420 can include an activity manager 421, a resource manager 422, and a view system application 423, in various embodiments. The application layer 410 can include built-in applications and/or third party applications. Examples of representative built-in applications can include, but are not limited to, a contacts application, a browser application, a book reader application, a location application, a media application, a messaging application, and/or a game application. Third party applications can include any of the built in applications as well as a broad assortment of other applications. In a specific example, the third party application (e.g., an application developed using the Android™ or iOS™ software development kit (SDK) by an entity other than the vendor of the particular platform) can be mobile software running on a mobile operating system such as iOS™, Android™, Windows® Phone, or other mobile operating systems. In this example, the third party application can invoke application programming interface (API) calls provided by the operating system to facilitate functionality described herein. A financial institution application 411 can implement the functionality of a triage tool for investment advising, in one embodiment. The triage tool can be a built-in or third party application, and can include a user interface 412 and application elements 413 in various embodiments.

The applications in application layer 410 can utilize built in operating system functions (e.g., kernel, services and/or drivers), libraries, frameworks and middleware to create user interfaces to interact with users of the system. Alternatively, or additionally, in some systems interactions with a user can occur through a presentation layer. In these systems, the application/module "logic" can be separated from the aspects of the application/module that interact with a user.

Figure 5:
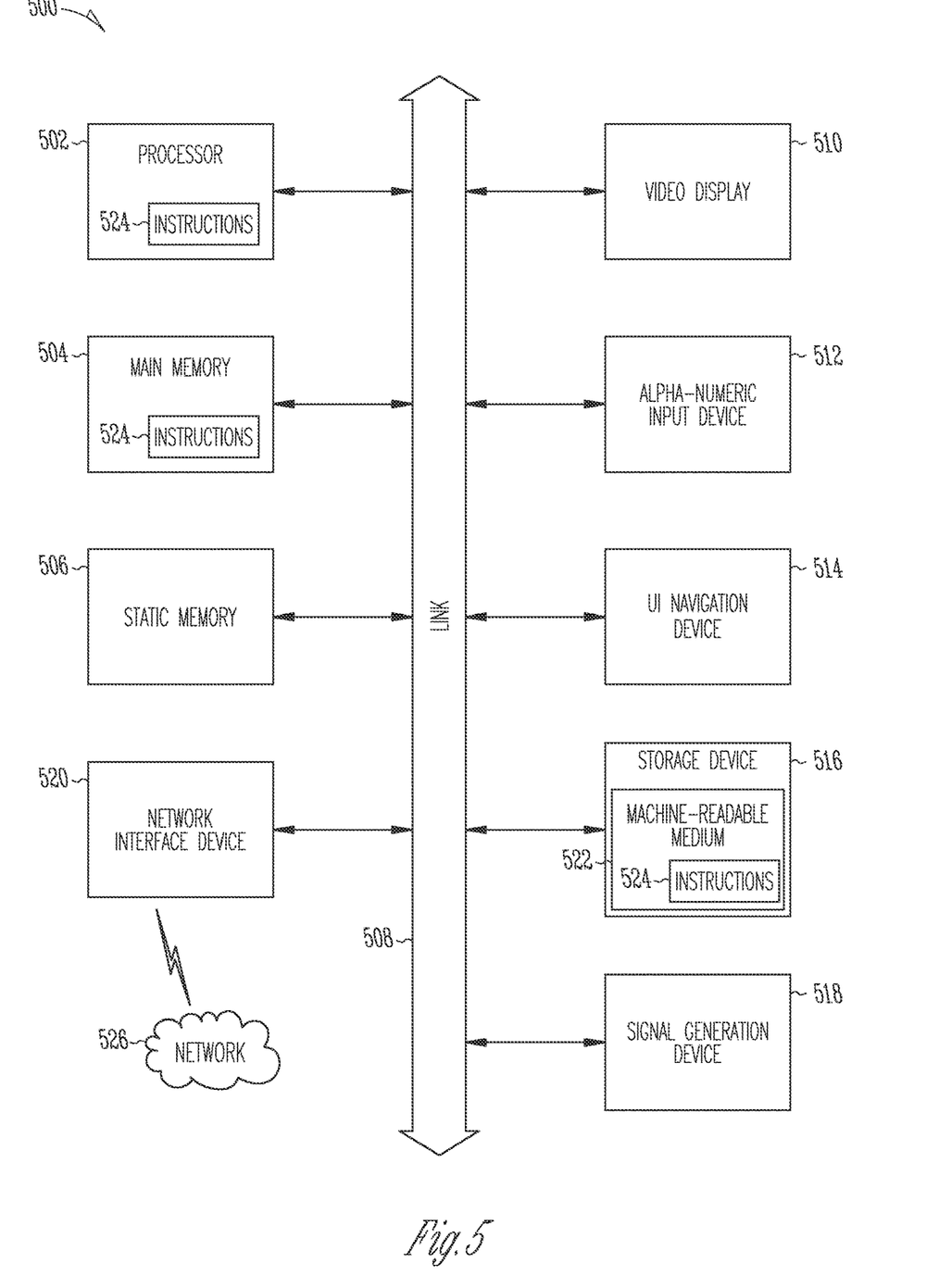
FIG. 5 is a block diagram of a machine in the example form of a computer system within which a set of instructions can be executed, for causing the machine to perform any one or more of the methodologies discussed herein.

FIG. 5 is a block diagram illustrating a machine in the example form of a computer system 500, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile or cellular telephone such as a smart phone, a wearable device such as a smart watch, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The data storage device 516 includes a machine-readable medium 522 on which is stored one or more sets of data structures and instructions 524 (e.g., software) embodying or utilized by any one or more of the methodologies or functions described herein. The instructions 524 may include a machine learning system or algorithm, and can also reside, completely or at least partially, within the main memory 504, static memory 506, and/or within the processor 502 during execution thereof by the computer system 500, with the main memory 504, static memory 506, and the processor 502 also constituting machine-readable media.

While the non-transitory computer-readable storage medium 522 is illustrated in an example embodiment to be a single medium, the term "machine-readable medium" or "computer-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone system (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:
1. A method comprising:
displaying, by a processor of a computer, an image on a graphical user interface (GUI) of a device of a user, the image including information related to financial account management for the user, wherein the displaying is initiated when the user attempts to access a financial account;

displaying, by the processor, input options to the user on the GUI including at least two directional swipe input options, including at least one option to obtain a positive response and at least one option to obtain a negative response to the image from the user;

receiving, by the processor, the user's response to the input options;

calculating, by the processor, a number of points earned by the user related to the financial account management for the user;

correlating, by the processor, the user's response with a level of acceptable risk and financial acumen, using trained data from a machine learning algorithm;

calculating, by the processor, a biographical profile of the user based on the correlated level of acceptable risk and financial acumen; and providing, by the processor using the GUI, directed financial investment advice and tailored financial products, based on the biographical profile of the user, including providing an option on the GUI for the user to redeem a portion of the number of points in exchange for a consultation with a financial advisor.

2. The method of claim 1, wherein the at least two directional swipe input options include a first horizontal swipe option to indicate a positive association by the user of the image.

3. The method of claim 2, wherein the at least two directional swipe input options include a second horizontal swipe option to indicate a negative association by the user of the image, wherein the second horizontal swipe option is in an opposite direction to the first horizontal swipe option.

4. The method of claim 1, wherein the at least two directional swipe input options include a vertical swipe option to indicate the user has a question about the image.

5. The method of claim 4, wherein receiving the vertical swipe option includes displaying a frequently asked questions interface.

6. The method of claim 4, wherein receiving the vertical swipe option includes displaying an interface configured for an interactive session with a representative of a financial institution.

7. The method of claim 1, wherein the at least two directional swipe input options include a vertical swipe option to indicate the user has a like or dislike of the image.

8. The method of claim 1, wherein displaying the image includes periodically displaying an image of a plurality of images to obtain additional information from the user for use in determining the profile of the user.

9. The method of claim 8, wherein the additional information is aggregated and stored for use in determining the profile of the user.

10. The method of claim 1, further comprising:
providing, by the processor, a notification to the device of the user prompting the user to display the image on the GUI and to provide a response to the input options.

11. The method of claim 10, wherein the notification is customized for the user.

12. A system comprising:
a computing device comprising at least one processor and a data storage device in communication with the at least one processor, wherein the data storage device comprises instructions thereon that, when executed by the at least one processor, causes the at least one processor to:

display an image on a graphical user interface (GUI) of a device of a user, the image including information related to financial account management for the user, wherein the display is initiated when the user attempts to access a financial account;

display input options to the user on the GUI including at least two directional swipe input options, including at least one option to obtain a positive response and at least one option to obtain a negative response to the image from the user;

receive the user's response to the input options;

calculate a number of points earned by the user related to the financial account management for the user;

correlate the user's response with a level of acceptable risk and financial acumen, using trained data from a machine learning algorithm;

calculate a biographical profile of the user based on the correlated level of acceptable risk and financial acumen; and provide directed financial investment advice and tailored financial products using the GUI, based on the biographical profile of the user, including providing an option on the GUI for the user to redeem a portion of the number of points in exchange for a consultation with a financial advisor.

13. The system of claim 12, wherein the image includes one or more of investment questions, personal questions, risk-assessment questions, graphs, or contextual inquiries, related to possible investment goals of the user.

14. The system of claim 12, wherein the user profile includes one or more of investment goals of the user, investment preferences of the user, investment experience of the user, desired investment advice of the user, risk tolerance of the user, suitability of financial products for the user, psychographic profile of the user, biographical information of the user, or life events of the user.

15. The system of claim 12, wherein the financial products include one or more of financial advisor-directed or self-directed portfolio management tools.

16. A non-transitory computer-readable storage medium, the computer-readable storage medium including instructions that when executed by computers, cause the computers to perform operations of:

displaying an image on a graphical user interface (GUI) of a device of a user, the image including information related to financial account management for the user, wherein the displaying is initiated when the user attempts to access a financial account;

displaying input options to the user on the GUI including at least two directional swipe input options, including at least one option to obtain a positive response and at least one option to obtain a negative response to the image from the user;

receiving the user's response to the input options;

calculating a number of points earned by the user related to the financial account management for the user;

correlating the user's response with a level of acceptable risk and financial acumen, using trained data from a machine learning algorithm;

calculating a biographical profile of the user based on the correlated level of acceptable risk and financial acumen; and providing directed financial investment advice and tailored financial products using the GUI, based on the biographical profile of the user, including providing an option on the GUI for the user to redeem a portion of the number of points in exchange for a consultation with a financial advisor.

17. The non-transitory computer-readable storage medium of claim 16, wherein the at least two directional swipe input options include a vertical swipe option, and wherein receiving the vertical swipe option includes displaying an interface configured for an interactive session with a representative of a financial institution.

18. The non-transitory computer-readable storage medium of claim 16, wherein providing financial advice includes automatically providing a connection for the user with a representative of a financial institution.

19. The non-transitory computer-readable storage medium of claim 16, wherein providing financial investment advice includes providing one or more of recommendations regarding individual transactions, or recommendations regarding investment advisor contacts for the user.

20. The non-transitory computer-readable storage medium of claim 16, further comprising the operations of:
   providing connection to user's investment account, wherein the input options include an option for the user to initiate financial account transactions from the GUI.

* * * * *